US012518902B2

(12) United States Patent
Okumura et al.

(10) Patent No.: US 12,518,902 B2
(45) Date of Patent: Jan. 6, 2026

(54) COIL COMPONENT

(71) Applicant: TDK Corporation, Tokyo (JP)

(72) Inventors: Takeshi Okumura, Tokyo (JP);
Tomonaga Nishikawa, Tokyo (JP);
Kouji Kawamura, Tokyo (JP);
Hidenori Tsutsui, Tokyo (JP); Yosuke Mizutani, Tokyo (JP); Hiroshi Sagawa, Tokyo (JP); Kenji Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1137 days.

(21) Appl. No.: 17/486,281

(22) Filed: Sep. 27, 2021

(65) Prior Publication Data

US 2022/0102045 A1    Mar. 31, 2022

(30) Foreign Application Priority Data

Sep. 28, 2020    (JP) ................................. 2020-162539

(51) Int. Cl.
*H01F 27/28*    (2006.01)
*H01F 17/00*    (2006.01)
*H01F 27/29*    (2006.01)

(52) U.S. Cl.
CPC ......... *H01F 17/0013* (2013.01); *H01F 27/29* (2013.01); *H01F 2017/0026* (2013.01); *H01F 2017/0073* (2013.01); *H01F 2017/0093* (2013.01)

(58) Field of Classification Search
CPC ............... H01F 17/0013; H01F 27/292; H01F 2017/0093; H01F 2017/0073
USPC .................................. 336/200, 232, 198, 192
See application file for complete search history.

(56) References Cited

U.S. PATENT DOCUMENTS

| | | | | |
|---|---|---|---|---|
| 2009/0003191 A1* | 1/2009 | Inuzuka | ............... | H01F 17/0013 369/283 |
| 2013/0169399 A1* | 7/2013 | Yoo | ..................... | H01F 17/0013 427/125 |
| 2013/0321115 A1* | 12/2013 | Lee | ........................ | H01F 41/046 336/200 |
| 2014/0191838 A1* | 7/2014 | Yoshida | .............. | H01F 27/2804 336/200 |
| 2014/0220364 A1* | 8/2014 | Umemoto | ................. | C03C 8/22 428/434 |
| 2016/0344181 A1* | 11/2016 | Matsunaga | ............ | H01G 4/005 |
| 2016/0372254 A1* | 12/2016 | Harada | ................ | H01F 27/2804 |
| 2017/0125159 A1* | 5/2017 | Karino | ..................... | H01F 27/33 |
| 2019/0103216 A1* | 4/2019 | Matsuda | ............. | H01F 17/0013 |

FOREIGN PATENT DOCUMENTS

| | | | |
|---|---|---|---|
| JP | 2012012447 A | * | 1/2012 |
| JP | 6586878 B2 | | 10/2019 |
| JP | 2020-038979 A | | 3/2020 |
| JP | 6678292 B2 | | 4/2020 |

* cited by examiner

*Primary Examiner* — Shawki S Ismail
*Assistant Examiner* — Kazi S Hossain
(74) *Attorney, Agent, or Firm* — Rimon P.C.

(57) ABSTRACT

Disclosed herein is a coil component that includes a first conductor layer having first and third planar spiral coils and second conductor layer having second planar spiral coil. The first planar spiral coil is positioned on an outer peripheral side of the third planar spiral coil. The first planar spiral coil has a pattern width larger than that of the third planar spiral coil. The second planar spiral coil is offset to the third planar spiral coil side in a plan view.

17 Claims, 9 Drawing Sheets

COIL COMPONENT

BACKGROUND OF THE INVENTION

Field of the Invention

The present invention relates to a coil component and, more particularly, to a coil component in which three planar spiral coils are magnetically coupled to one another.

Description of Related Art

Typical common mode filters have a structure in which two planar spiral coils are magnetically coupled to each other and are widely used to remove common mode noise superimposed on differential transmission lines. In recent years, a transmission line composed of three lines as one set is sometimes used, and thus there is required a coil component in which three planar spiral coils are magnetically coupled to one another as a coil component for removing common mode noise superimposed on such a transmission line.

A coil component in which three planar spiral coils are magnetically coupled to one another is described in Japanese Patent No. 6,586,878, JP 2020-038979A, and Japanese Patent No. 6,678,292. Japanese Patent No. 6,586,878 (FIG. 2 thereof), JP 2020-038979A (FIG. 3 thereof), and Japanese Patent No. 6,678,292 (FIG. 3 thereof) disclose coil components having a structure in which conductor layers each having two planar spiral coils and conductor layers each having one planar spiral coil are alternately stacked.

However, in the coil components described in Japanese Patent No. 6,586,878, JP 2020-038979A, and Japanese Patent No. 6,678,292, two planar spiral coils formed in the same conductor layer have the same pattern width, thus causing a difference in DC resistance due to a difference between inner and outer peripheries.

It is therefore an object of the present invention to reduce a difference in DC resistance due to a difference between inner and outer peripheries in a coil component having three planar spiral coils.

SUMMARY

A coil component according to the present invention includes: a plurality of conductor layers stacked one on another through insulating layers and having first, second, and third planar spiral coils with the same number of turns; first, second, and third terminal electrodes connected respectively to one ends of the first, second, and third planar spiral coils; and fourth, fifth, and sixth terminal electrodes connected respectively to the other ends of the first, second, and third planar spiral coils. The plurality of conductor layers include first and second conductor layers stacked one on another in this order. The first and third planar spiral coils are formed in the first conductor layer, and the second planar spiral coil is formed in the second conductor layer. The first planar spiral coil is positioned on the outer peripheral side of the third planar spiral coil. The first planar spiral coil has a pattern width larger than that of the third planar spiral coil. The second planar spiral coil is offset to the third planar spiral coil side in a plan view.

According to the present invention, the pattern width of the first planar spiral coil positioned on the outer peripheral side is increased, so that it is possible to reduce a difference between the inner and outer peripheries. In addition, the second planar spiral coil is offset to the third planar spiral coil side, so that it is also possible to prevent disruption of capacitance balance due to a difference in pattern width between the first and third planar spiral coils.

In the present invention, the plurality of conductor layers may include first, second, third, and fourth conductor layers stacked one on another in this order, the first and third planar spiral coils may be formed further on the third conductor layer, and the second planar spiral coil may be formed further on the fourth conductor layer. This allows a larger number of turns to be assured.

In this case, the pattern width of the second planar spiral coil formed in the second conductor layer may be smaller than that of the second planar spiral coil formed in the fourth conductor layer, or the pattern width of each of the first and third planar spiral coils formed in the third conductor layer is smaller than that of each of the first and third planar spiral coils formed in the first conductor layer. This reduces the floating capacitance generated between the second and third conductor layers, making it possible to enhance high-frequency characteristics such as mode conversion characteristics as compared with conventional coil components having three planar spiral coils.

As described above, according to the present invention, it is possible to reduce a difference in DC resistance due to a difference between inner and outer peripheries in a coil component having three planar spiral coils.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
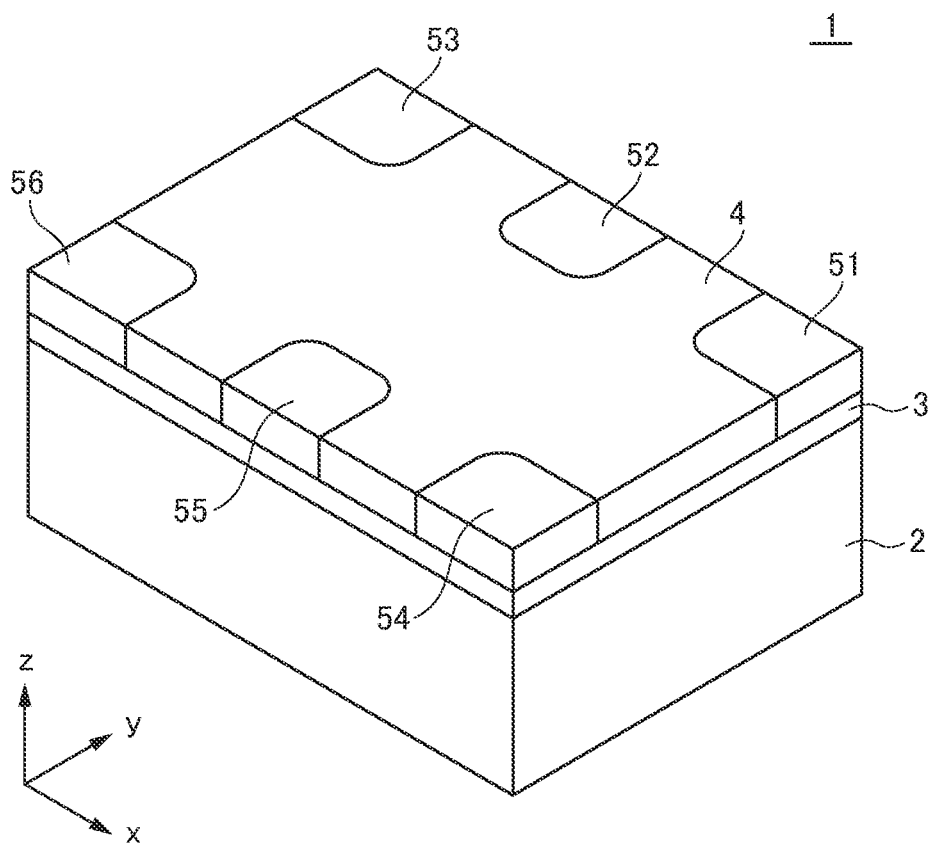
FIG. 1 is a schematic perspective view illustrating the outer appearance of a coil component 1 according to an embodiment of the present invention.

FIG. 1 is a schematic perspective view illustrating the outer appearance of a coil component 1 according to an embodiment of the present invention turned upside down from its mounted state.

As illustrated in FIG. 1, the coil component 1 according to the present embodiment is a surface-mount type common mode filter having a substantially rectangular parallelepiped shape and includes a substrate 2, a coil layer 3 provided on the surface of the substrate 2, a resin layer 4 covering the coil layer 3, and six terminal electrodes 51 to 56 connected to the coil layer 3. The substrate 2 is made of a magnetic material (ferrite, etc.) or a non-magnetic material. The substrate 2 has a role of supporting the coil layer 3 and ensuring mechanical strength of the coil component 1. When the substrate 2 is made of a magnetic material, the substrate 2 functions also as a magnetic path for a magnetic field generated from the coil layer 3. The resin layer 4 may also be made of a magnetic material or a non-magnetic material. When the resin layer 4 is made of a composite material obtained by dispersing magnetic powder made of a metallic magnetic material in a binder resin, it functions as a magnetic path for a magnetic field generated from the coil layer 3. The resin layer 4 may be omitted. The terminal electrodes 51 to 56 are disposed at respective corners or edges of the coil component 1 and are each embedded in the resin layer 4 such that the upper and the side surface thereof are exposed.

The terminal electrodes 51 to 53 are provided along one long side of the coil component 1 extending in the x-direction, and the terminal electrodes 54 to 56 are provided along the other long side of the coil component 1 extending in the x-direction. Although not particularly limited, the terminal electrodes 51, 53, 54, and 56 are disposed at the corners of the coil component 1 and are thus each exposed to three side surfaces (xy surface, xz surface, and yz surface) of the coil component 1. On the other hand, the remaining terminal electrodes 52 and 55 are exposed to two surfaces (xy surface and xz surface) of the coil component 1. Further, although not particularly limited, the terminal electrodes 51 to 56 are formed by a thick film plating method, and the thickness of each thereof is sufficiently larger than an electrode pattern formed by a sputtering method or a screen printing.

Figure 2:
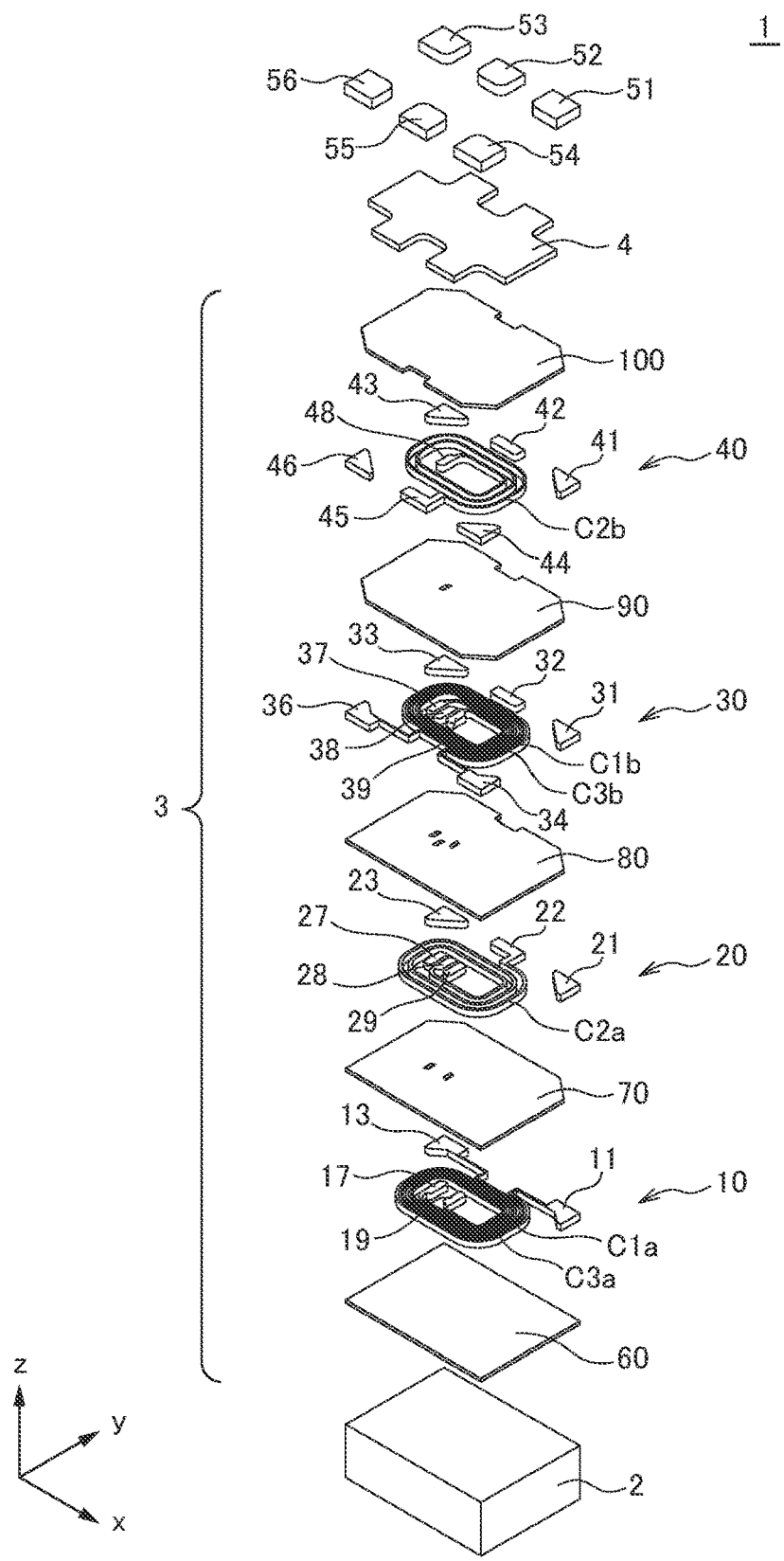
FIG. 2 is a schematic exploded perspective view of the coil component 1.

FIG. 2 is a schematic exploded perspective view of the coil component 1.

As illustrated in FIG. 2, the coil layer 3 includes insulating layers 60, 70, 80, 90, and 100 stacked in this order from the substrate 2 side toward the resin layer 4, and four conductor layers 10, 20, 30, and 40 are formed between the insulating layers 60 and 70, insulating layers 70 and 80, insulating layers 80 and 90, and insulating layers 90 and 100, respectively. The insulating layers 60, 70, 80, 90, and 100 are made of an insulating material, such as resin, and have a role of separating the conductor layers 10, 20, 30, and 40 from one another. The conductor layers 10, 20, 30, and 40 are made of a good conductor, such as copper (Cu).

Figure 3:
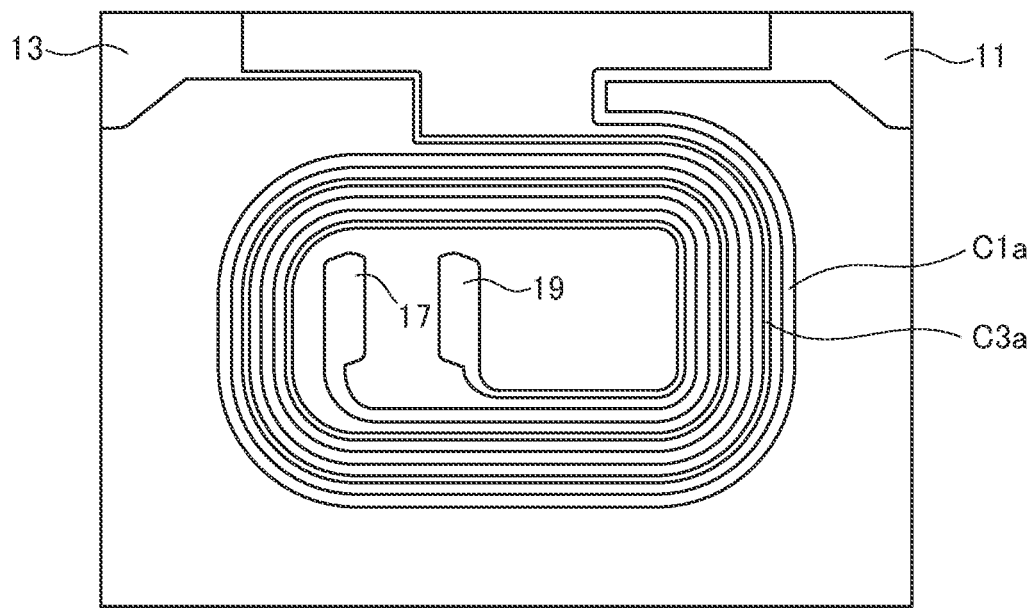
FIG. 3 is a schematic plan view illustrating a conductor layer 10.

The conductor layer 10 is formed on the surface of the insulating layer 60. As illustrated in FIG. 3, the conductor layer 10 includes planar spiral coils C1a and C3a and connection patterns 11, 13, 17, and 19. The planar spiral coils C1a and C3a are concentrically wound along each other on the outer and inner peripheral sides, respectively, in three turns in the clockwise direction (right-handed direction) from the outer peripheral to inner peripheral ends in a plan view. The outer peripheral end of the planar spiral coil C1a is connected to the connection pattern 11, and the inner peripheral end thereof is connected to the connection pattern 17. The outer peripheral end of the planar spiral coil C3a is connected to the connection pattern 13, and the inner peripheral end thereof is connected to the connection pattern 19. As explained later, the pattern width of the planar spiral coil C1a is greater than the pattern width of the planar spiral coil C3a.

Figure 4:
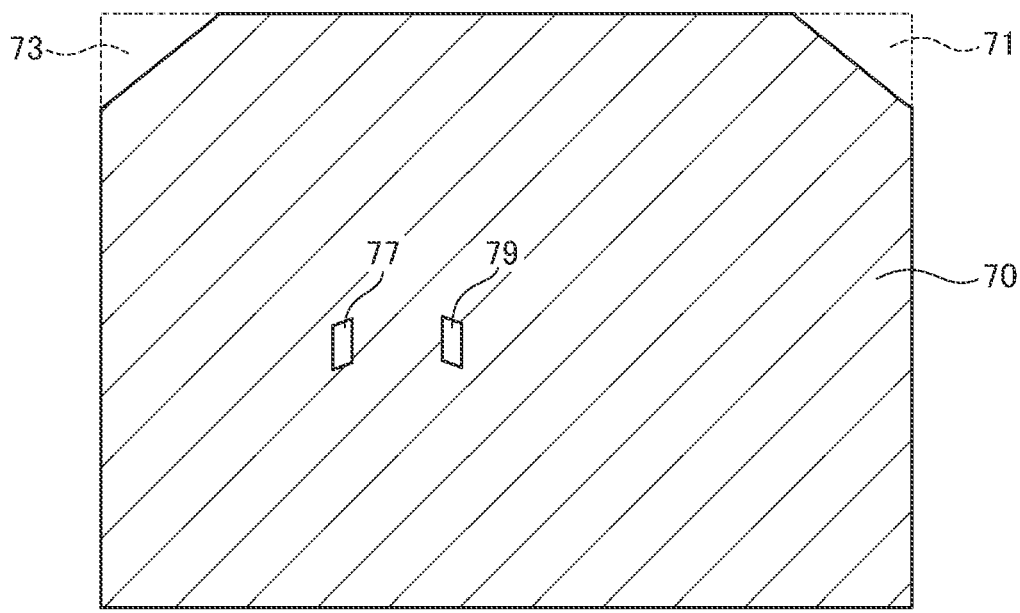
FIG. 4 is a schematic plan view illustrating an insulating layer 70.

The conductor layer 10 is covered with the insulating layer 70. As illustrated in FIG. 4, the insulating layer 70 has vias 71, 73, 77, and 79. The vias 71, 73, 77, and are formed at positions overlapping the connection patterns 11, 13, 17, and 19, respectively, whereby the connection patterns 11, 13, 17, and 19 are exposed from the insulating layer 70 respectively through the vias 71, 73, 77, and 79.

Figure 5:
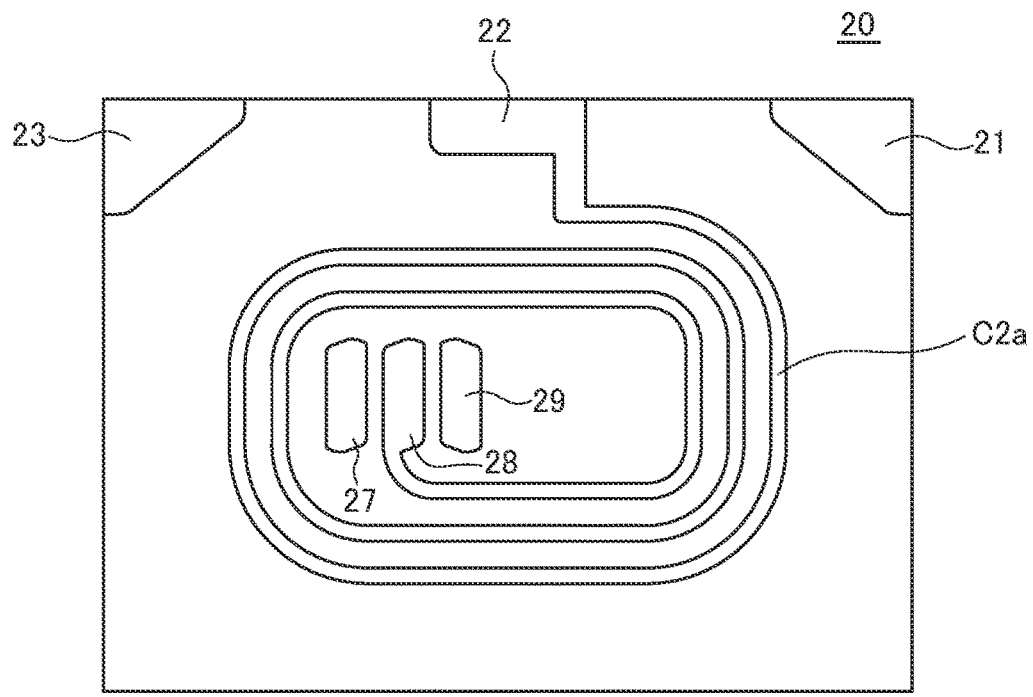
FIG. 5 is a schematic plan view illustrating a conductor layer 20.

The conductor layer 20 is formed on the surface of the insulating layer 70. As illustrated in FIG. 5, the conductor layer 20 includes a planar spiral coil C2a and connection patterns 21 to 23 and 27 to 29. The planar spiral coil C2a is wound in three turns in the clockwise direction (right-handed direction) from the outer peripheral to inner peripheral ends in a plan view. The outer peripheral end of the planar spiral coil C2a is connected to the connection pattern 22, and the inner peripheral end thereof is connected to the connection pattern 28. The remaining connection patterns 21, 23, 27, and 29 are not connected to any connection pattern in the same plane but are provided independently. The connection patterns 21, 23, 27, and 29 are provided at positions overlapping the vias 71, 73, 77, and 79, respectively, and are thus connected to the connection patterns 11, 13, 17, and 19.

Figure 6:
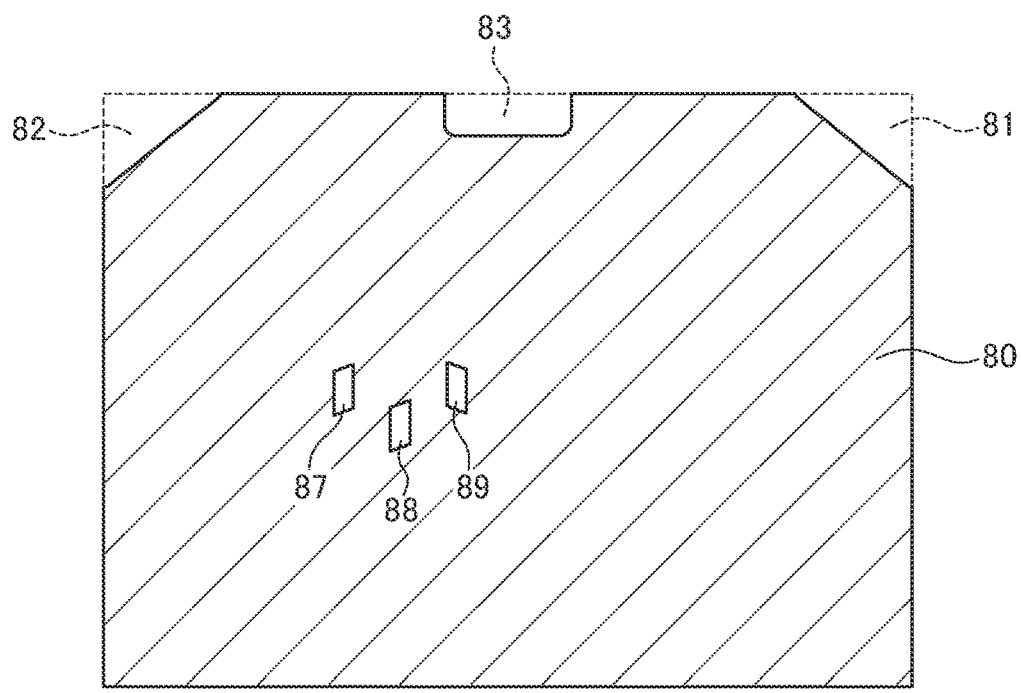
FIG. 6 is a schematic plan view illustrating an insulating layer 80.

The conductor layer 20 is covered with the insulating layer 80. As illustrated in FIG. 6, the insulating layer 80 has vias 81 to 83 and 87 to 89. The vias 81 to 83 and 87 to 89 are formed at positions overlapping the connection patterns 21 to 23 and 27 to 29, respectively, whereby the connection patterns 21 to 23 and 27 to 29 are exposed from the insulating layer 80 respectively through the vias 81 to 83 and 87 to 89.

Figure 7:
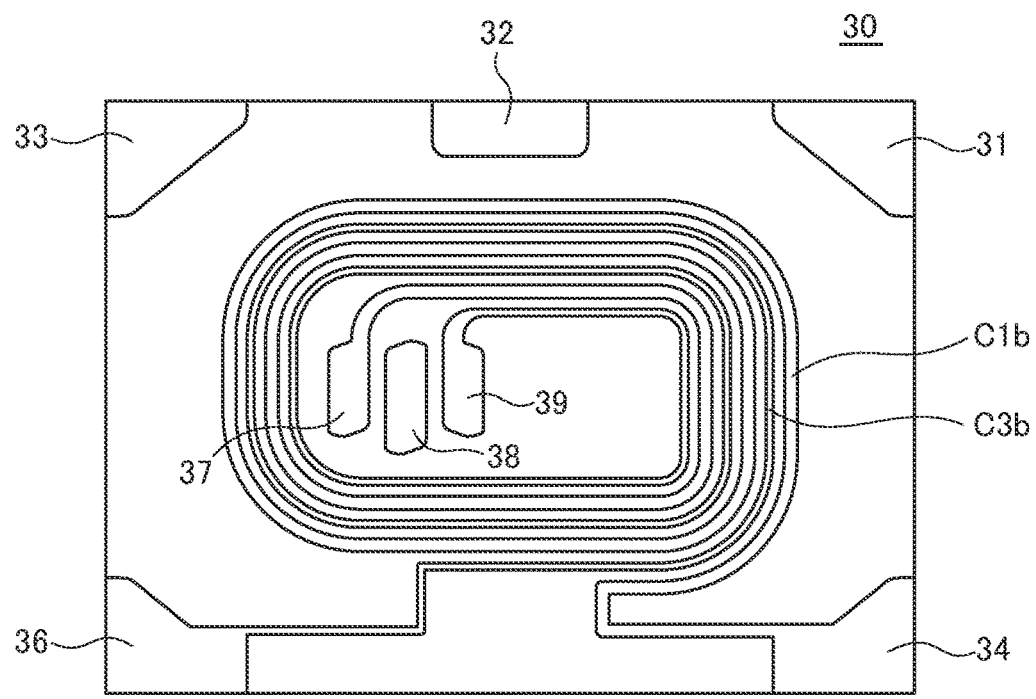
FIG. 7 is a schematic plan view illustrating a conductor layer 30.

The conductor layer 30 is formed on the surface of the insulating layer 80. As illustrated in FIG. 7, the conductor layer 30 includes planar spiral coils C1b and C3b and connection patterns 31 to 34 and 36 to 39. The planar spiral coils C1b and C3b are concentrically wound along each other on the outer and inner peripheral sides, respectively, in three turns in the counterclockwise direction (left-handed direction) from the outer peripheral to inner peripheral ends in a plan view. The outer peripheral end of the planar spiral coil C1b is connected to the connection pattern 34, and the inner peripheral end thereof is connected to the connection pattern 37. The outer peripheral end of the planar spiral coil C3b is connected to the connection pattern 36, and the inner peripheral end thereof is connected to the connection pattern 39. As explained later, the pattern width of the planar spiral coil C1b is greater than the pattern width of the planar spiral coil C3b. The remaining connection patterns 31 to 33 and 38 are not connected to any connection pattern in the same plane but are provided independently. The connection patterns 31 to 33 and 37 to 39 are provided at positions overlapping the vias 81 to 83 and 87 to 89, respectively, and are thus connected to the connection patterns 21 to 23 and 27 to 29. As a result, the inner peripheral end of the planar spiral coil C1b is connected to the inner peripheral end of the planar spiral coil C1a through the connection patterns 37, 27, and 17. Similarly, the inner peripheral end of the planer spiral coil C3b is connected to the inner peripheral end of the planar spiral coil C3a through the connection patterns 39, 29, and 19.

Figure 8:
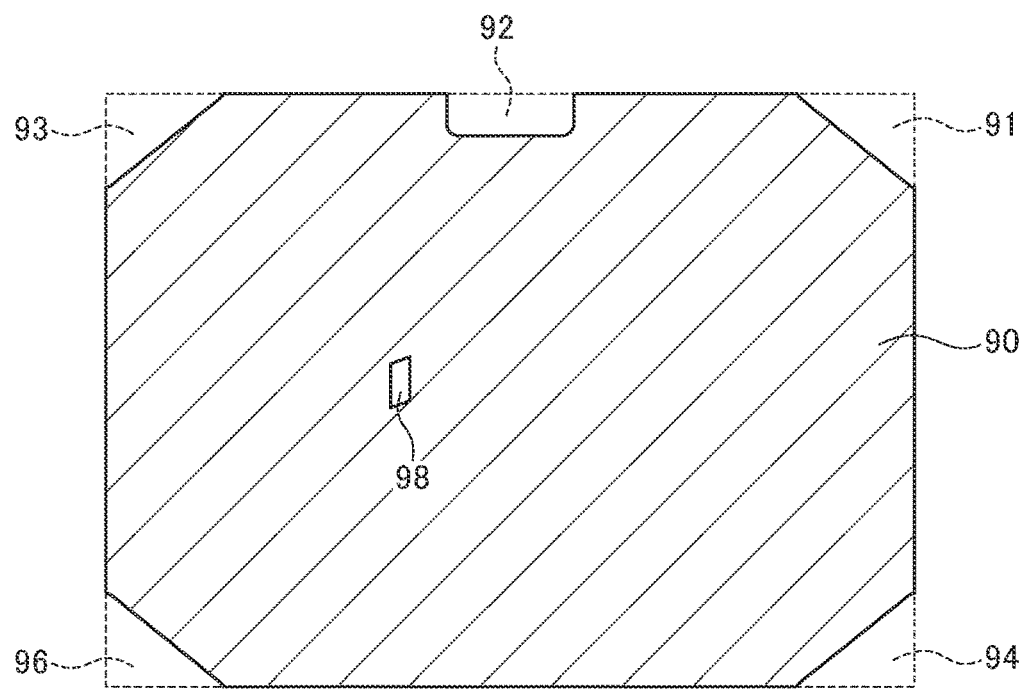
FIG. 8 is a schematic plan view illustrating an insulating layer 90.

The conductor layer 30 is covered with the insulating layer 90. As illustrated in FIG. 8, the insulating layer 90 has vias 91 to 94, 96, and 98. The vias 91 to 94, 96, and 98 are formed at positions overlapping the connection patterns 31 to 34, 36, and 38, respectively, whereby the connection patterns 31 to 34, 36, and 38 are exposed from the insulating layer 90 respectively through the vias 91 to 94, 96, and 98.

Figure 9:
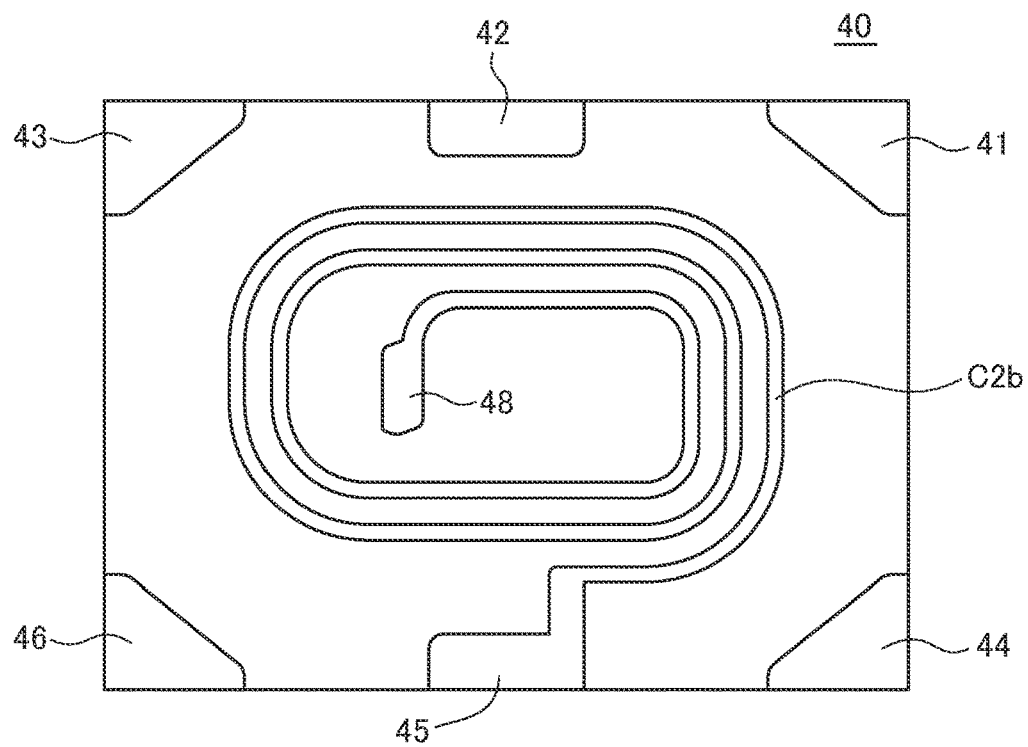
FIG. 9 is a schematic plan view illustrating a conductor layer 40.

The conductor layer 40 is formed on the surface of the insulating layer 90. As illustrated in FIG. 9, the conductor layer 40 includes a planar spiral coil C2b and connection patterns 41 to 46 and 48. The planar spiral coil C2b is wound in three turns in the counterclockwise direction (left-handed direction) from the outer peripheral to inner peripheral ends in a plan view. The outer peripheral end of the planar spiral coil C2b is connected to the connection pattern 45, and the inner peripheral end thereof is connected to the connection pattern 48. The remaining connection patterns 41 to 44 and 46 are not connected to any connection pattern in the same plane but are provided independently. The connection patterns 41 to 44, 46, and 48 are provided at positions overlapping the vias 91 to 94, 96, and 98, respectively, and are thus connected to the connection patterns 31 to 34, 36, and 38. As a result, the inner peripheral end of the planer spiral coil C2b is connected to the inner peripheral end of the planar spiral coil C2a through the connection patterns 48, 38, and 28.

Figure 10:
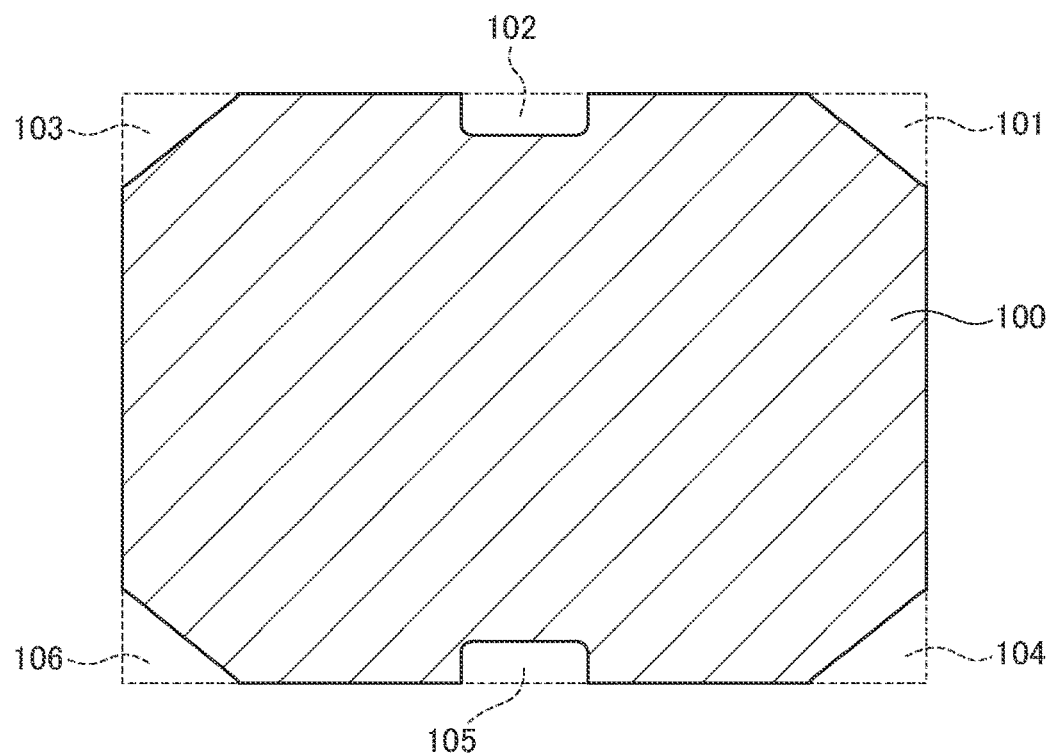
FIG. 10 is a schematic plan view illustrating an insulating layer 100.

The conductor layer 40 is covered with the insulating layer 100. As illustrated in FIG. 10, the insulating layer 100 has vias 101 to 106. The vias 101 to 106 are formed at positions overlapping the connection patterns 41 to 46, respectively, whereby the connection patterns 41 to 46 are exposed from the insulating layer 100 respectively through the vias 101 to 106.

The resin layer 4 and terminal electrodes 51 to 56 are provided on the surface of the insulating layer 100. The terminal electrodes 51 to 56 are provided at positions overlapping the vias 101 to 106, respectively, and are thus connected to the connection patterns 41 to 46, respectively.

Figure 11:
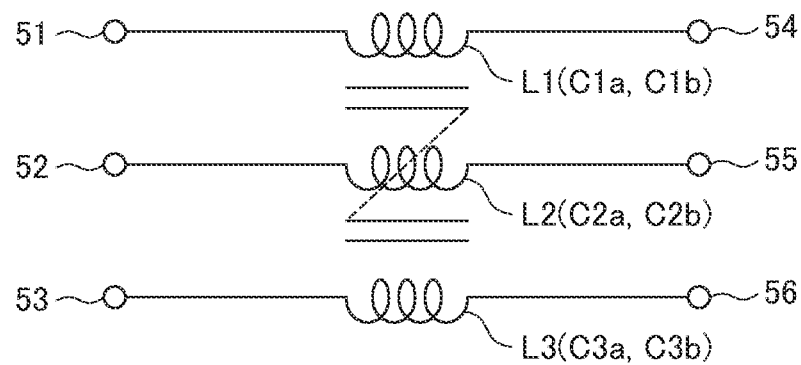
FIG. 11 is an equivalent circuit diagram of the coil component 1.

FIG. 11 is an equivalent circuit diagram of the coil component 1 according to the present embodiment.

As illustrated in FIG. 11, the planar spiral coils C1a and C1b are connected in series between the terminal electrodes 51 and 54, the planar spiral coils C2a and C2b are connected in series between the terminal electrodes 52 and 55, and the planar spiral coils C3a and C3b are connected in series between the terminal electrodes 53 and 56. The series-connected planar spiral coils C1a and C1b constitute an inductor L1, the series-connected planar spiral coils C2a and C2b constitute an inductor L2, and the series-connected planar spiral coils C3a and C3b constitute an inductor L3. The number of turns of each of the inductors L1 to L3 is six. The coil component 1 according to the present embodiment constitutes a three-line common mode filter circuit in which the three inductors L1 to L3 are magnetically coupled to one another.

Figure 12:
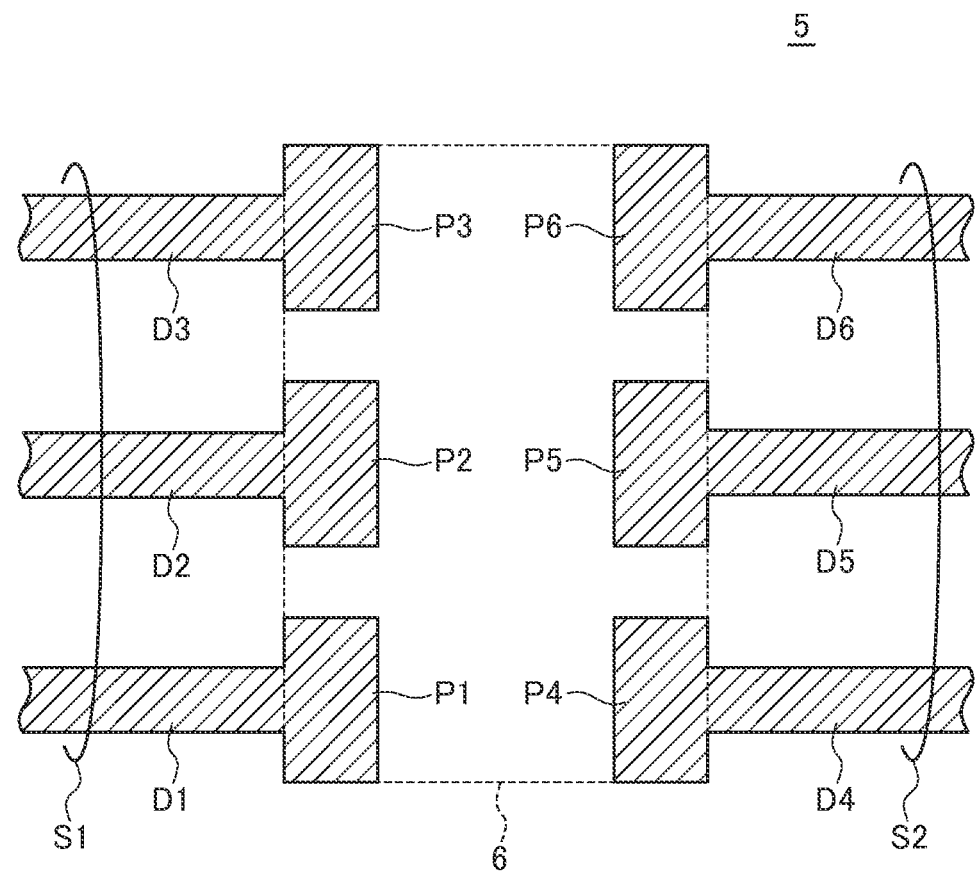
FIG. 12 is a schematic plan view for explaining the pattern shape of a circuit board 5 on which the coil component 1 is mounted.

FIG. 12 is a schematic plan view for explaining the pattern shape of a circuit board 5 on which the coil component 1 is mounted.

The circuit board 5 illustrated in FIG. 12 has a mounting area 6 in which the coil component 1 is mounted. The mounting area 6 has land patterns P1 to P6 corresponding respectively to the terminal electrodes 51 to 56. When the coil component 1 is mounted in the mounting area 6, the terminal electrodes 51 to 56 and land patterns P1 to P6 are electrically connected through solders.

On the circuit board 5, signal lines D1 to D6 are connected respectively to the land patterns P1 to P6. The three signal lines D1 to D3 constitute a line group S1 and the three signal lines D4 to D6 constitute a line group S2. For example, the line group S1 serves as an input-side line group, and the line group S2 serves as an output-side line group. Data of three signals transmitted by the line groups S1 and S2 are represented as a potential difference between two signals. For example, in the line group S1, data are represented by the magnitude relation between the levels of the signal lines D1 and D2, the magnitude relation between the levels of the signal lines D1 and D3, and the magnitude relation between the levels of the signal lines D2 and D3. The same applies to the line group S2. Thus, in this example, 3-bit data can be transmitted at a time. By inserting the coil component 1 according to the present embodiment between the thus configured line groups S1 and S2, common mode noise superimposed on the three signals can be removed.

Figure 13:
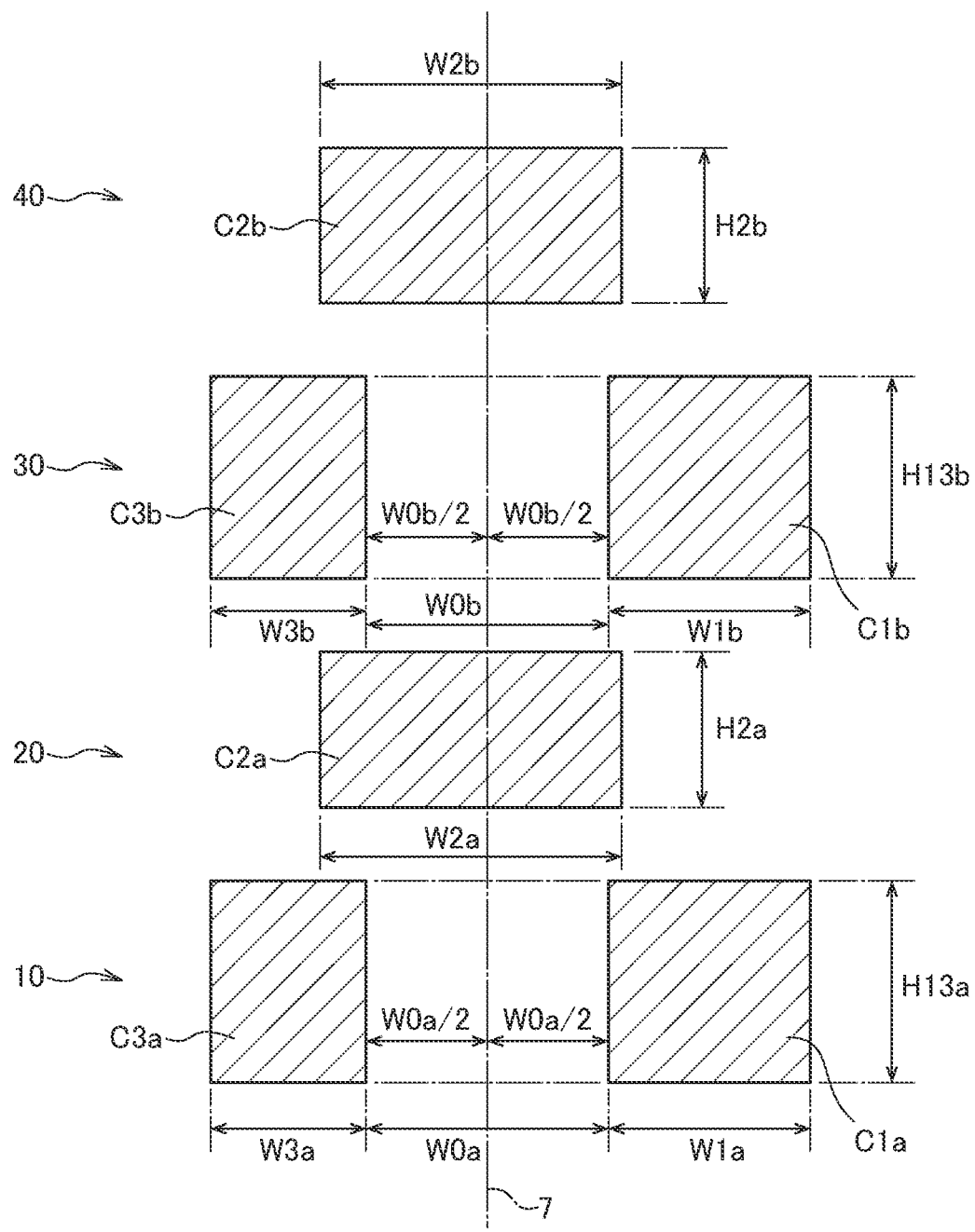
FIG. 13 is a partial cross-sectional view of the planar spiral coils C1$a$ to C3$a$ and C1$b$ to C3$b$ in the stacking direction.

FIG. 13 is a partial cross-sectional view of the planar spiral coils C1a to C3a and C1b to C3b in the stacking direction.

As illustrated in FIG. 13, the radial widths of the planar spiral coils C1a to C3a and C1b to C3b are W1a to W3a and W1b to W3b, respectively. The thickness of each of the planar spiral coils C1a and C3a is H13a, the thickness of the planar spiral coil C2a is H2a, the thickness of each of the planar spiral coils C1b and C3b is H13b, and the thickness of the planar spiral coil C2b is H2b. In the present embodiment, $$W2a=W2b>W1a=W1b>W3a=W3b \text{ and}$$

$$H13a=H13b>H2a=H2b \text{ are satisfied.}$$

The pattern widths W1a and W1b of the planar spiral coils C1a and C1b positioned on the outer peripheral side in the respective conductor layers 10 and 30 are made larger than the pattern widths W3a and W3b of the planar spiral coils C3a and C3b positioned on the inner peripheral side, so that a difference in DC resistance due to a difference between inner and outer peripheries can be reduced.

Further, the planar spiral coils C2a and C2b are disposed offset to the planar spiral coils C3a and C3b side from a virtual line 7. The virtual line 7 passes the center line between the same turns of the planar spiral coils C1a and C3a (C1b and C3b). That is, assuming that the space width between the same turns of the planar spiral coils C1a and C3a (C1b and C3b) is W0a (W0b), the position of the virtual line 7 is away from the edge of each of the planar spiral coils C1a and C3a (C1b and C3b) by W0a/2 (W0b/2). The radial center positions of the planar spiral coils C2a and C2b do not coincide with the virtual line 7 but are offset to the planar spiral coils C3a and C3b side.

When the radial center positions of the planar spiral coils C2a and C2b are made to coincide with the virtual line 7, a capacitance component between the planar spiral coils C1a and C2a (C1b and C2b) becomes larger than a capacitance component between the planar spiral coils C3a and C2a (C3b and C2b) by the increase in the pattern widths W1a and W1b of the planar spiral coils C1a and C1b, which will disrupt capacitance balance. Considering this, in the present embodiment, the planar spiral coils C2a and C2b are offset to the planar spiral coils C3a and C3b side so as to prevent capacitance balance from being disrupted.

As a result, the inductors L1 to L3 are magnetically coupled substantially uniformly.

The widths W1a and W1b need not necessarily be the same as each other, and the widths W3a and W3b need not necessarily be the same as each other. Further, the widths W1a, W3a, W1b, and W3b need not necessarily be smaller than the widths W2a and W2b. The thicknesses H13a and H13b need not necessarily be the same as each other and the thicknesses H2a and H2b need not necessarily be the same as each other. Further, the thickness H13a and H13b need not necessarily be larger than the thicknesses H2a and H2b.

As described above, in the coil component 1 according to the present embodiment, the pattern widths W1a and W1b of the planar spiral coils C1a and C1b positioned on the outer peripheral side are increased, so that it is possible to reduce a difference in DC resistance due to a difference between inner and outer peripheries. In addition, the planar spiral coils C2a and C2b are offset to the planar spiral coils C3a and C3b side, capacitance balance can be maintained.

Figure 14:
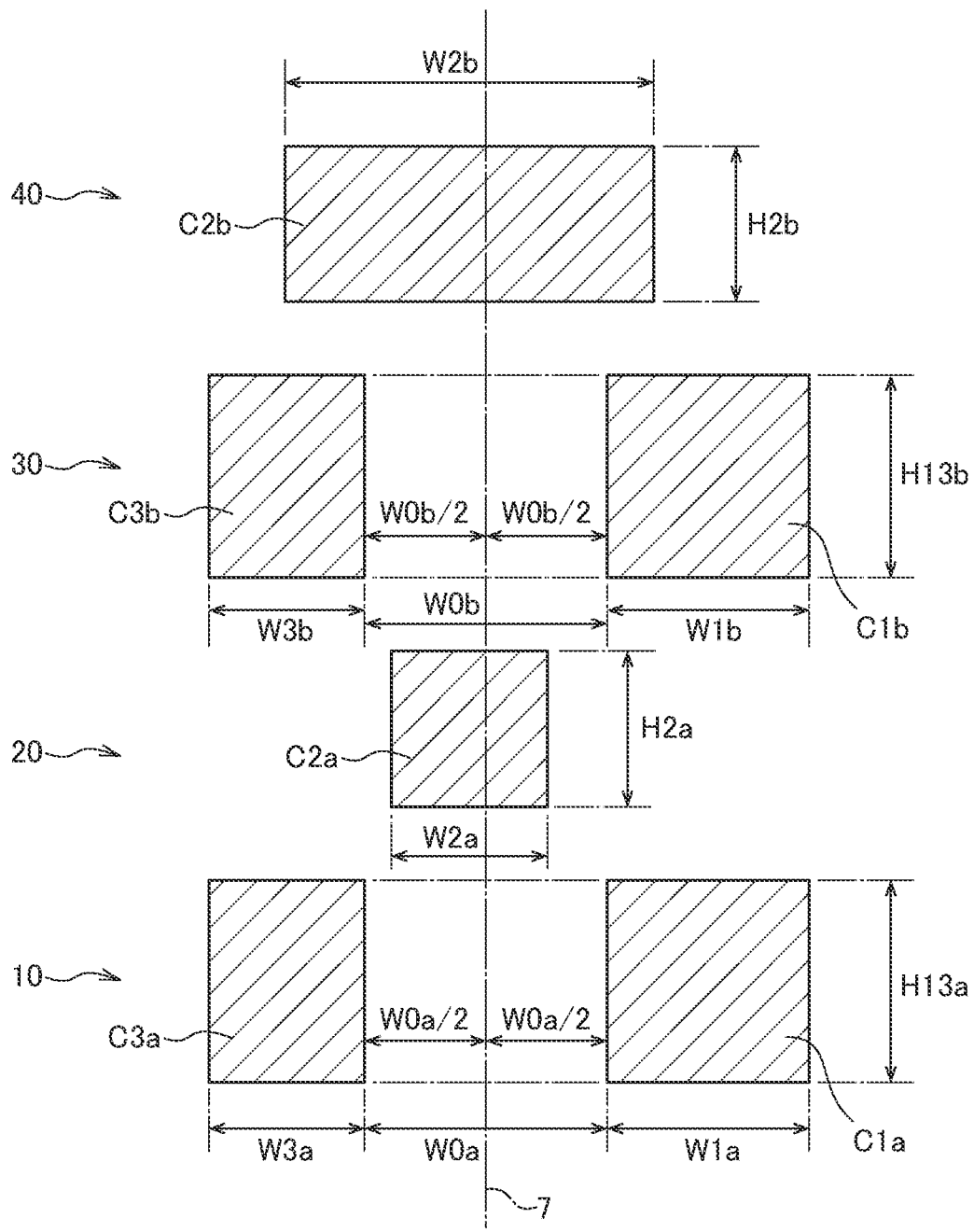
FIG. 14 is a partial cross-sectional view of the planar spiral coils C1$a$ to C3$a$ and C1$b$ to C3$b$ according to a modification.

FIG. 14 is a partial cross-sectional view of the planar spiral coils C1a to C3a and C1b to C3b according to a modification.

A coil component according to the modification illustrated in FIG. 14 differs from the coil component 1 according to the above embodiment in that W2b>W2a is satisfied. By thus reducing the pattern width W2a of the planar spiral coil C2a, the floating capacitance between the planar spiral coil C2a positioned in the conductor layer 20 and the planar spiral coils C1b and C3b positioned in the conductor layer 30 is reduced, whereby it is possible to prevent deterioration in high-frequency characteristics due to the floating capacitance. For further reduction in the floating capacitance, the planar spiral coil C2a and the planar spiral coils C1b, C3b should preferably not overlap each other in a plan view. On the other hand, when the pattern width W2a of the planar spiral coil C2a is reduced, the DC resistance of the inductor L2 increases, and the capacitance balance between the inductor L2 and the inductors L1, L3 changes. Thus, in order to cancel the reduction in the width W2a, the pattern width W2b of the planar spiral coil C2b positioned in the conductor layer 40 is made larger than the pattern width W2a. This can suppress an increase in the DC resistance of the inductor L2 and maintain the capacitance balance between the inductor L2 and the inductors L1, L3.

It is apparent that the present disclosure is not limited to the above embodiments, but may be modified and changed without departing from the scope and spirit of the disclosure.

For example, although the conductor layers 10, 20, 30, and 40 are stacked in this order on the substrate 2 in the above embodiment, they may be stacked in the reverse order (40, 30, 20, and 10 from the bottom).

Further, the insulating layer 80 may be made of a material having a lower dielectric constant than those of the insulating layers 60, 70, 90, and 100 so as to further reduce the floating capacitance generated between the planar spiral coil C2a and the planar spiral coils C1b and C3b.

What is claimed is:

1. A coil component comprising:
a plurality of conductor layers stacked one on another through insulating layers and having first, second, and third planar spiral coils with a same number of turns;
first, second, and third terminal electrodes connected respectively to one ends of the first, second, and third planar spiral coils; and
fourth, fifth, and sixth terminal electrodes connected respectively to other ends of the first, second, and third planar spiral coils,
wherein the plurality of conductor layers include first and second conductor layers stacked one on another in this order,
wherein the first and third planar spiral coils are formed in the first conductor layer,
wherein the second planar spiral coil is formed in the second conductor layer,
wherein the first planar spiral coil is positioned on an outer peripheral side of the third planar spiral coil,
wherein the first planar spiral coil has a pattern width larger than that of the third planar spiral coil,
wherein the second planar spiral coil is offset to the third planar spiral coil side in a plan view,
wherein each of the first, second, and third planar spiral coils includes first and second turns,
wherein the first turn of the second planar spiral coil overlaps a space between the first turn of the first planar spiral coil and the first turn of the third planar spiral coil,
wherein the second turn of the second planar spiral coil overlaps a space between the second turn of the first planar spiral coil and the second turn of the third planar spiral coil, and
wherein a space between the first turn of the third planar spiral coil and the second turn of the first planar spiral coil does not overlap the second planar spiral coil.

2. The coil component as claimed in claim 1, wherein the plurality of conductor layers include first, second, third, and fourth conductor layers stacked one on another in this order,
wherein the first and third planar spiral coils are formed further on the third conductor layer, and
wherein the second planar spiral coil is formed further on the fourth conductor layer.

3. The coil component as claimed in claim 2, wherein a pattern width of the second planar spiral coil formed in the second conductor layer is smaller than that of the second planar spiral coil formed in the fourth conductor layer, or the pattern width of each of the first and third planar spiral coils formed in the third conductor layer is smaller than that of each of the first and third planar spiral coils formed in the first conductor layer.

4. A coil component comprising:
a first conductor layer having first and second coil patterns; and
a second conductor layer located above the first conductor layer, the second conductor layer having a third coil pattern,
wherein each turn of the first coil pattern is positioned on an outer peripheral side of an associated turn of the second coil pattern,
wherein each turn of the third coil pattern is positioned on an inner peripheral side of an associated turn of the first coil pattern and positioned on an outer peripheral side of an associated turn of the second coil pattern,
wherein a width of the first coil pattern is greater than a width of the second coil pattern, and
wherein a radial center position of each turn of the third coil pattern is offset to an inner peripheral side with respect to a radial center position of a space between associated turns of the first and second coil patterns.

5. The coil component as claimed in claim 4, wherein a width of the third coil pattern is greater than the width of the first coil pattern.

6. The coil component as claimed in claim 4, wherein a thickness of the first and second coil patterns is greater than a thickness of the third coil pattern.

7. The coil component as claimed in claim 4, further comprising:
- a third conductor layer located above the second conductor layer, the third conductor layer having fourth and fifth coil patterns; and
- a fourth conductor layer located above the third conductor layer, the fourth conductor layer having a sixth coil pattern,
- wherein an inner peripheral end of the first coil pattern is connected to an inner peripheral end of the fourth coil pattern,
- wherein an inner peripheral end of the second coil pattern is connected to an inner peripheral end of the fifth coil pattern, and
- wherein an inner peripheral end of the third coil pattern is connected to an inner peripheral end of the sixth coil pattern.

8. The coil component as claimed in claim 7,
- wherein each turn of the fourth coil pattern is positioned on an outer peripheral side of an associated turn of the fifth coil pattern,
- wherein each turn of the sixth coil pattern is positioned on an inner peripheral side of an associated turn of the fourth coil pattern and positioned on an outer peripheral side of an associated turn of the fifth coil pattern,
- wherein a width of the fourth coil pattern is greater than a width of the fifth coil pattern, and
- wherein a radial center position of each turn of the sixth coil pattern is offset to an inner peripheral side with respect to a radial center position of a space between associated turns of the fourth and fifth coil patterns.

9. The coil component as claimed in claim 8, wherein a width of the third coil pattern is different from a width of the sixth coil pattern.

10. The coil component as claimed in claim 9, wherein the width of the third coil pattern is smaller than the width of the sixth coil pattern.

11. The coil component as claimed in claim 10, wherein the fourth and fifth coil patterns do not overlap the third coil pattern.

12. A coil component comprising:
- a first conductor layer having first and second coil patterns;
- a second conductor layer located above the first conductor layer, the second conductor layer having a third coil pattern;
- a third conductor layer located above the second conductor layer, the third conductor layer having fourth and fifth coil patterns; and
- a fourth conductor layer located above the third conductor layer, the fourth conductor layer having a sixth coil pattern,
- wherein an inner peripheral end of the first coil pattern is connected to an inner peripheral end of the fourth coil pattern,
- wherein an inner peripheral end of the second coil pattern is connected to an inner peripheral end of the fifth coil pattern,
- wherein an inner peripheral end of the third coil pattern is connected to an inner peripheral end of the sixth coil pattern,
- wherein each turn of the first coil pattern is positioned on an outer peripheral side of an associated turn of the second coil pattern,
- wherein a width of the first coil pattern is greater than a width of the second coil pattern,
- wherein each turn of the third coil pattern overlaps an associated turn of the first and second coil patterns,
- wherein an overlap amount of the first and third coil patterns is smaller than that of the second and third coil patterns,
- wherein each turn of the fourth coil pattern is positioned on an outer peripheral side of an associated turn of the fifth coil pattern,
- wherein each turn of the sixth coil pattern is positioned on an inner peripheral side of an associated turn of the fourth coil pattern and positioned on an outer peripheral side of an associated turn of the fifth coil pattern,
- wherein a width of the fourth coil pattern is greater than a width of the fifth coil pattern,
- wherein each turn of the sixth coil pattern overlaps an associated turn of the fourth and fifth coil patterns, and
- wherein an overlap amount of the fourth and sixth coil patterns is smaller than that of the fifth and sixth coil patterns.

13. The coil component as claimed in claim 12, wherein a width of the third coil pattern is greater than the width of the first coil pattern.

14. The coil component as claimed in claim 12, wherein a thickness of the first and second coil patterns is greater than a thickness of the third coil pattern.

15. The coil component as claimed in claim 1, wherein the second planar spiral coil has a pattern width larger than that of the first planar spiral coil.

16. The coil component as claimed in claim 1,
- wherein each of the first, second, and third planar spiral coils further includes a third turn,
- wherein the third turn of the second planar spiral coil overlaps a space between the third turn of the first planar spiral coil and the third turn of the third planar spiral coil, and
- wherein a space between the second turn of the third planar spiral coil and the third turn of the first planar spiral coil does not overlap the second planar spiral coil.

17. The coil component as claimed in claim 13, wherein a thickness of the second coil pattern is greater than the width of the second coil pattern.

* * * * *